US012159634B2

(12) United States Patent
Norvell

(10) Patent No.: US 12,159,634 B2
(45) **Date of Patent: *Dec. 3, 2024**

(54) ADAPTIVE GAIN-SHAPE RATE SHARING

(71) Applicant: Telefonaktiebolaget LM Ericsson (publ), Stockholm (SE)

(72) Inventor: Erik Norvell, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 567 days.

This patent is subject to a terminal disclaimer.

(21) Appl. No.: 16/983,554

(22) Filed: Aug. 3, 2020

(65) Prior Publication Data

US 2020/0365164 A1 Nov. 19, 2020

Related U.S. Application Data

(63) Continuation of application No. 16/227,235, filed on Dec. 20, 2018, now Pat. No. 10,770,078, which is a (Continued)

(51) Int. Cl.

*G10L 19/002* (2013.01)
*G10L 19/02* (2013.01)
*G10L 19/038* (2013.01)

(52) U.S. Cl.

CPC ........ *G10L 19/002* (2013.01); *G10L 19/0212* (2013.01); *G10L 19/038* (2013.01)

(58) Field of Classification Search

CPC ....... G10L 19/002; G10L 19/00; G10L 19/02; G10L 19/0204; G10L 19/0208;

(Continued)

(56) References Cited

U.S. PATENT DOCUMENTS 5,819,215 A 10/1998 Dobson et al.
6,680,972 B1 1/2004 Liljeryd et al.

(Continued)

FOREIGN PATENT DOCUMENTS

JP 2009501944 A 1/2009
JP 2009042734 A 2/2009

(Continued)

OTHER PUBLICATIONS

Valin et al., "A Full-Bandwidth Audio Codec With Low Complexity and Very Low Delay", Signal processing conference (EUSIPCO) , Aug. 24-28, 2009.*

*Primary Examiner* — Qi Han

(74) *Attorney, Agent, or Firm* — Murphy, Bilak & Homiller, PLLC

(57) ABSTRACT

An improved gain-shape vector quantization is achieved by determining a number of bits to be allocated to a gain adjustment- and shape-quantizer for a plurality of combinations of a current bit rate and a first signal property. The bit allocation is derived by using an average of optimal bit allocations for a training data set. A number of bits to the gain adjustment and the shape quantizers for a plurality of combinations of the bit rate and a first signal are pre-calculated, and a table indicating the number of bits to be allocated to the gain adjustment- and the shape-quantizers for a plurality of combinations of the bit rate and a first signal property is created. In this way, the table can be used for achieving an improved bit allocation.

20 Claims, 9 Drawing Sheets

Related U.S. Application Data continuation of application No. 15/367,005, filed on Dec. 1, 2016, now Pat. No. 10,192,558, which is a continuation of application No. 14/110,355, filed as application No. PCT/SE2011/051238 on Oct. 17, 2011, now Pat. No. 9,548,057.

(60) Provisional application No. 61/475,767, filed on Apr. 15, 2011.

(58) Field of Classification Search
CPC ............... G10L 19/0212; G10L 19/032; G10L 19/035; G10L 19/038; G10L 19/167; G10L 19/24
USPC ....... 704/222, 203, 205, 206, 221, 224, 225, 704/229, 230, 500, 501
See application file for complete search history.

(56) References Cited

U.S. PATENT DOCUMENTS

| | | | | |
|---|---|---|---|---|
| 2002/0007273 | A1* | 1/2002 | Chen | G10L 19/02 704/229 |
| 2007/0016414 | A1 | 1/2007 | Mehrotra et al. | |
| 2007/0147518 | A1 | 6/2007 | Bessette et al. | |
| 2008/0140393 | A1 | 6/2008 | Kim et al. | |
| 2010/0070269 | A1* | 3/2010 | Gao | G10L 19/24 704/207 |
| 2010/0070270 | A1 | 3/2010 | Gao et al. | |
| 2013/0030795 | A1 | 1/2013 | Sung et al. | |
| 2013/0339038 | A1 | 12/2013 | Norvell et al. | |

FOREIGN PATENT DOCUMENTS

| | | | |
|---|---|---|---|
| JP | 2010538316 | A | 12/2010 |
| WO | 2012121637 | A1 | 9/2012 |

* cited by examiner

PRIOR ART

PRIOR ART

ADAPTIVE GAIN-SHAPE RATE SHARING

TECHNICAL FIELD

Embodiments of the present invention relate to methods and devices used for audio coding and decoding, and in particular to gain-shape quantizers of the audio coders and decoders.

BACKGROUND

Modern telecommunication services are expected to handle many different types of audio signals. While the main audio content is speech signals, there is a desire to handle more general signals such as music and mixtures of music and speech. Although the capacity in telecommunication networks is continuously increasing, it is still of great interest to limit the required bandwidth per communication channel. In mobile networks, smaller transmission bandwidths for each call yields lower power consumption in both the mobile device and the base station. This translates to energy and cost saving for the mobile operator while the end user will experience prolonged battery life and increased talk-time. Further, with less consumed bandwidth per user the mobile network can service a larger number of users in parallel.

Today, the dominating compression technology for mobile voice services is Code Excited Linear Prediction (CELP), which achieves good audio quality for speech quality at low bandwidths. It is widely used in deployed codecs such as GSM Enhanced Full Rate (GSM-EFR), Adaptive Multi Rate (AMR) and AMR-Wideband (AMR-WB). However, for general audio signals such as music the CELP technology has poor performance. These signals can often be better represented by using frequency transform based coding, for example the ITU-T codecs G.722.1 and G.719. However, transform domain codecs generally operate at a higher bitrate than the speech codecs. There is a gap between the speech and general audio domains in terms of coding and it is desirable to increase the performance of transform domain codecs at lower bitrates.

Transform domain codecs require a compact representation of the frequency domain transform coefficients. These representations often rely on vector quantization (VQ), where the coefficients are encoded in groups. An example of vector quantization is gain-shape VQ. This approach applies normalization to the vectors before encoding the individual coefficients. The normalization factor and the normalized coefficients are referred to as the gain and the shape of the vector, which may be encoded separately. The gain-shape structure has many benefits. By dividing the gain and the shape, the codec can easily be adapted to varying source input levels by designing the gain quantizer. It is also beneficial from a perceptual perspective where the gain and shape may carry different importance in different frequency regions. Finally, the gain-shape division simplifies the quantizer design and makes is less complex in terms of memory and computational resources compared to an unconstrained vector quantizer. A functional overview of a gain-shape quantizer for one vector according to prior art can be seen in FIG. 1, which illustrates an encoder 40 and a decoder 50 side. In FIG. 1, an arbitrary input data vector x 100 of length L is fed to a gain-shape quantization scheme. Here, the gain factor is defined as the Euclidean norm (2-norm) of the vector, which implies that the terms gain and norm are used interchangeably throughout this document. First, a norm g is calculated by a norm calculator 110 which represents the overall size of the vector. Commonly, the Euclidean norm is used $$g = \sqrt{\sum_{i=1}^{L} x_i^2}. \tag{1}$$

The norm is then quantized by a norm quantizer 120 to form $\hat{g}$ and a quantization index IN representing the quantized norm. The input vector is scaled using $1/\hat{g}$ to form a normalized shape vector n, which in turn is fed to the shape quantizer 130. The quantizer index $I_S$ from the shape quantizer 130 and the norm quantizer 120 are multiplexed by a bitstream multiplexer 140 to be stored or transmitted to a decoder 50. The decoder 50 retrieves the indices $I_N$ and $I_S$ from the demultiplexed bitstream and forms a reconstructed vector $\hat{x}$ 190 by retrieving the quantized shape vector $\hat{n}$ from the shape decoder 150 and the quantized norm from the norm decoder 160 and scaling the quantized shape with $\hat{g}$ 180.

The gain-shape quantizer generally operates on vectors of limited length, but they can be used to handle longer sequences by first partitioning the signal into shorter vectors and applying the gain-shape quantizers to each vector. This structure is often used in transform based audio codecs. FIG. 2 exemplifies a transform based coding system for gain and shape quantization for a sequence of vectors according to prior art. It should be noted that FIG. 1 illustrates a gain-shape quantizer for one vector while the gain-shape quantization in FIG. 2 is applied parallel on a sequence of vectors, wherein the vectors together constitute a frequency spectrum. The sequence of the gain (norm) values constitute the spectral envelope. The input audio 200 is first partitioned into time segments or frames as a preparation for the frequency transform 210. Each frame is transformed to the frequency domain to form a frequency domain spectrum X. This may be done using any suitable transform, such as MDCT, DCT or DFT. The choice of transform may depend on the characteristics of the input signal, such that important properties are well modeled with that transform. It may also include considerations for other processing steps if the transform is reused for other processing steps, such as stereo processing. The frequency spectrum is partitioned into shorter row vectors denoted X (b). Each vector now represents the coefficients of a frequency band b. From a perceptual perspective it is beneficial to partition the spectrum using a non-uniform band structure which follows to the frequency resolution of the human auditory system. This generally means that narrow bandwidths are used for low frequencies while larger bandwidths are used for high frequencies.

Next, the norm of each band is calculated 230 as in equation (1) to form a sequence of gain values E(b) which form the spectral envelope. These values are then quantized using the envelope quantizer 240 to form the quantized envelope $\hat{E}(b)$. The envelope quantization 240 may be done using any quantizing technique, e.g. differential scalar quantization or any vector quantization scheme. The quantized envelope coefficients $\hat{E}(b)$ are used to normalize 250 the band vectors X (b) to form the corresponding normalized shape vectors N(b).

$$N(b) = \frac{1}{\hat{E}(b)} X(b). \tag{2}$$

Note that if the envelope quantization is accurate, i.e. $\hat{E}(b) \approx E(b)$, the norm of the normalized shape vectors will be 1. This relates to a pre-normalization that may be done in the decoder.

$$\hat{E}(b)=E(b) \Rightarrow \sqrt{N(b) \cdot N(b)^T}=1.$$

The sequence of normalized shape vectors constitutes the fine structure of the spectrum. The perceptual importance of the spectral fine structure varies with the frequency but may also depend on other signal properties such as the spectral envelope signal. Transform coders often employ an auditory model to determine the important parts of the fine structure and assign the available resources to the most important parts. The spectral envelope is often used as input to this auditory model and the output is typically a bit assignment for the each of the bands corresponding to the envelope coefficients. Here, a bit allocation algorithm 270 uses a quantized envelope $\hat{E}(b)$ in combination with an internal auditory model to assign a number of bits R(b) which in turn are used by the fine structure quantizer 260. The indices from the envelope quantization $I_E$ and the fine structure quantization $I_F$ are multiplexed by a bitstream multiplexer 280 to be stored or transmitted to a decoder.

The decoder demultiplexes in bitstream demultiplexer 285 the indices from the communication channel or the stored media and forwards the indices $I_F$ to the fine structure dequantizer 265 and the indices $I_E$ to the envelope dequantizer 245. The quantized envelope $\hat{E}(b)$ is obtained from an envelope de-quantizer 245 and fed to a bit allocation entity 275 in the decoder, which generates the bit allocation R(b). The fine structure dequantizer 265 uses the fine structure indices and the bit allocation to produce the quantized fine structure vectors $\hat{N}(b)$. A synthesized frequency spectrum $\hat{X}(b)$ is obtained by scaling in an envelope shaping entity 235 the quantized fine structure with the quantized envelope $$\hat{X}(b)=\hat{E}(b) \cdot \hat{N}(b). \quad (3)$$

The inverse transform 215 is applied to the synthesized frequency spectrum $\hat{X}(b)$ to obtain the synthesized output signal 290.

The performance of the gain-shape VQ for different bit rates depends on how the gain and shape quantizers interact. In particular, some shape quantizers are capable of compensating small energy deviations which may reside from the gain quantization. Other shape quantizers can be said to be pure shape quantizers, which cannot represent any gain information and cannot compensate the gain quantizer error at all. For the pure shape quantizer, the gain-shape system becomes sensitive to the bit sharing between gain and shape. One possible solution is to assign an additional gain adjustment factor after the shape quantization to adjust the gain based on the synthesized shape, as shown in FIG. 3. FIG. 3 shows a transform based coding system as illustrated in FIG. 2 with the addition of the gain adjustment analyzer 301, to assign a respective additional gain adjustment factor G(b). This is found by comparing the quantized fine structure $\hat{N}(b)$ with the fine structure N(b)

$$G(b) = \frac{\hat{N}(b)^T N(b)}{N(b)^T N(b)}.$$

The gain adjustment factor G(b) is quantized to produce an index $I_G$ which is multiplexed together with the fine structure indices $I_F$ and envelope indices $I_E$ to be stored or transmitted to a decoder.

Recall that a perfect envelope quantization would give $\sqrt{N(b) \cdot N(b)^T}=1$. By pre-adjusting the gain of the quantized fine structure, the gain adjustment factor may also handle quantization errors from the envelope quantization. This can be done using equation (1) to obtain a pre-adjustment gain factor $g_n$.

$$g_n = \frac{1}{\sqrt{\hat{N}(b) \cdot \hat{N}(b)^T}},$$

which gives that $$\sqrt{g_n \hat{N}(b) \cdot g_n \hat{N}(b)^T}=1.$$

Now, if $\hat{N}(b)$ is substituted with $\hat{N}'(b)=g_n\hat{N}(b)$ in the gain adjustment calculation such that $$G(b) = \frac{\hat{N}'(b)^T N(b)}{N(b)^T N(b)},$$

then the gain adjustment factor G(b) may also compensate for errors in the envelope quantization. This method is considered prior-art and hereafter it is assumed that a pre-adjustment to have $\sqrt{\hat{N}(b) \cdot \hat{N}(b)^T}=1$ is an integral part of the shape dequantizer.

The decoder of FIG. 3 is similar to the decoder of FIG. 2, but with the addition of a gain adjustment unit 302 which uses the gain adjustment index $I_G$ to reconstruct a quantized gain adjustment factor $\hat{G}(b)$. This is in turn used to create a gain adjusted fine structure $\tilde{N}(b)$:

$$\tilde{N}(b)=\hat{G}(b) \cdot \hat{N}(b).$$

As in FIG. 2, a synthesized frequency spectrum $\hat{X}(b)$ is obtained by scaling the gain adjusted fine structure with the envelope $$\hat{X}(b)=\hat{E}(b) \cdot \tilde{N}(b).$$

The inverse transform is applied to the synthesized frequency spectrum $\hat{X}(b)$ to obtain the synthesized output signal.

However, at low bitrates the gain adjustment may consume too many bits which reduces the performance of the shape quantizer and gives poor overall performance.

SUMMARY

An object of embodiments of the present invention is to provide an improved gain-shape VQ.

This is achieved by determining a number of bits to be allocated to a gain adjustment- and shape-quantizer for a plurality of combinations of a current bit rate and a first signal property. The determined allocated number of bits to the gain adjustment- and shape quantizer should provide a better result for the given bitrate and signal property than using a single fixed allocation scheme. That can be achieved by deriving the bit allocation by using an average of optimal bit allocations for a training data set. Thus, by pre-calculating a number of bits to the gain adjustment and the shape quantizers for a plurality of combinations of the bit rate and a first signal property and creating a table indicating the number of bits to be allocated to the gain adjustment- and the shape-quantizers for a plurality of combinations of the bit rate and a first signal property. In this way, the table can be used for achieving an improved bit allocation.

According to a first aspect of embodiments of the present invention a method in an encoder for allocating bits to a gain adjustment quantizer and a shape quantizer to be used for encoding a gain shape vector is provided. In the method, a current bitrate and a first signal property value are determined. One bit allocation is identified for the gain adjustment quantizer and the shape quantizer for the determined current bitrate and the first signal property by using information from a table indicating at least one bit allocation for the gain adjustment quantizer and the shape quantizer which are mapped to a bitrate and a first signal property. Further, the identified bit allocation is applied when encoding the gain shape vector.

According to a second aspect of embodiments of the present invention a method in a decoder for allocating bits to a gain adjustment dequantizer and a shape dequantizer to be used for decoding a gain shape vector is provided. In the method, a current bitrate and a first signal property value are determined. One bit allocation is identified for the gain adjustment dequantizer and the shape dequantizer for the determined current bitrate and the first signal property by using information from a table indicating at least one bit allocation for the gain adjustment dequantizer and the shape dequantizer which are mapped to a bitrate and a first signal property. Further, the identified bit allocation is applied when decoding the gain shape vector.

According to a third aspect of embodiments of the present invention an encoder for allocating bits to a gain adjustment quantizer and a shape quantizer to be used for encoding a gain shape vector is provided. The encoder comprises an adaptive bit sharing entity configured to determine a current bitrate and a first signal property value. Further, the adaptive bit sharing entity is configured to identify one bit allocation for the gain adjustment quantizer and the shape quantizer for the determined current bitrate and the first signal property by using information from a table indicating at least one bit allocation for the gain adjustment quantizer and the shape quantizer which are mapped to a bitrate and a first signal property. The encoder further comprises a gain adjustment and a shape quantizer which is configured to apply the identified bit allocation when encoding the gain shape vector.

According to a fourth aspect of embodiments of the present invention a decoder for allocating bits to a gain adjustment dequantizer and a shape dequantizer to be used for decoding a gain shape vector is provided. The decoder comprises an adaptive bit sharing entity configured to determine a current bitrate and a first signal property value, to use information from a table indicating at least one bit allocation for the gain adjustment dequantizer and the shape dequantizer which are mapped to a bitrate and a first signal property, and to identify one bit allocation for the gain adjustment dequantizer and the shape dequantizer for the determined current bitrate and the first signal property. The decoder further comprises a gain adjustment and a shape dequantizer configured to apply the identified bit allocation when decoding the gain shape vector.

According to further aspects of embodiments of the present invention, a mobile device is provided. According to one aspect the mobile device comprises an encoder according to the embodiments and according to another aspect the mobile device comprises a decoder according to the embodiments described herein.

An advantage with embodiments of the present invention is that the embodiments are particularly beneficial for gain-shape VQ systems where the shape VQ cannot represent energy and hence not compensate for the quantization error of the gain quantizer.

Another advantage is that the bit allocation according to embodiments of the present invention obtains a better overall gain-shape VQ result for different bitrates.

DETAILED TECHNICAL DESCRIPTION

Accordingly, the present invention relates to a solution for allocating bits to gain adjustment quantization and shape quantization, referred to as gain adjustment and shape quantization. That is achieved by using a table indicating a bit allocation for gain adjustment and shape quantizers for a number of combinations of bitrate and a first signal property. The bitrate is determined and the first signal property is either predefined by the encoder or determined. Then, the bit allocation for the gain adjustment and shape quantizers is determined by using said table based on the determined bitrate and the first signal property. The first signal property is a bandwidth according to a first embodiment or signal length according to a second embodiment as described below.

Figure 1:
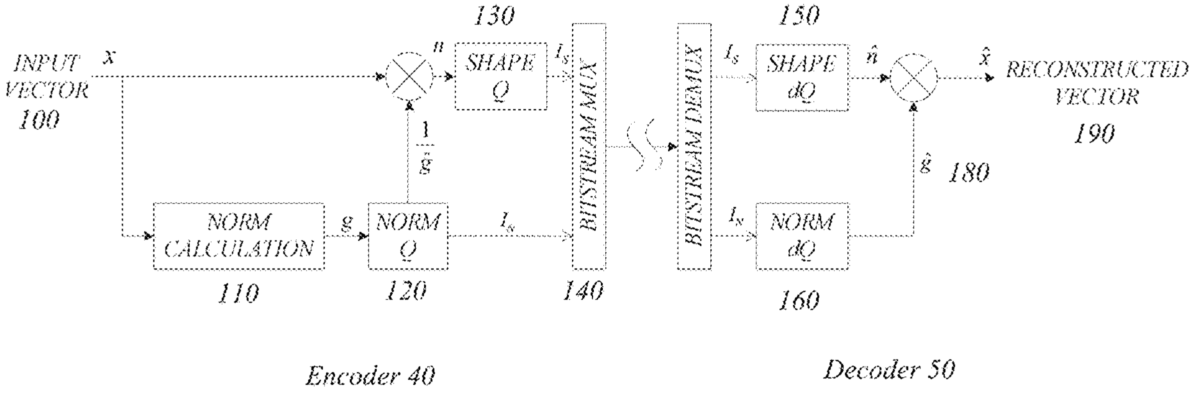
FIG. 1 is an example gain-shape vector quantization scheme according to prior art.
Figure 2:
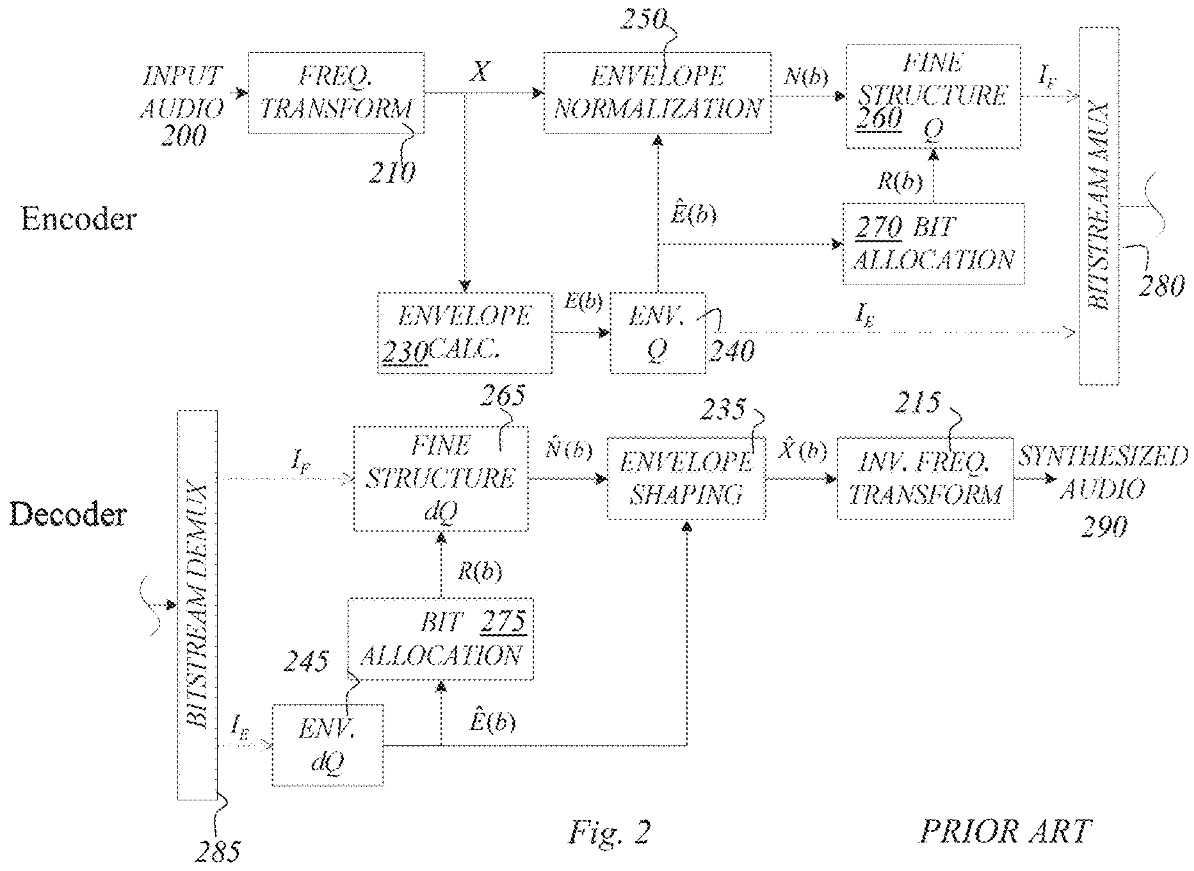
Fig. 2 PRIOR ART
FIG. 2 is an example transform domain coding and decoding scheme based on gain-shape vector quantization according to prior art.
Figure 3:
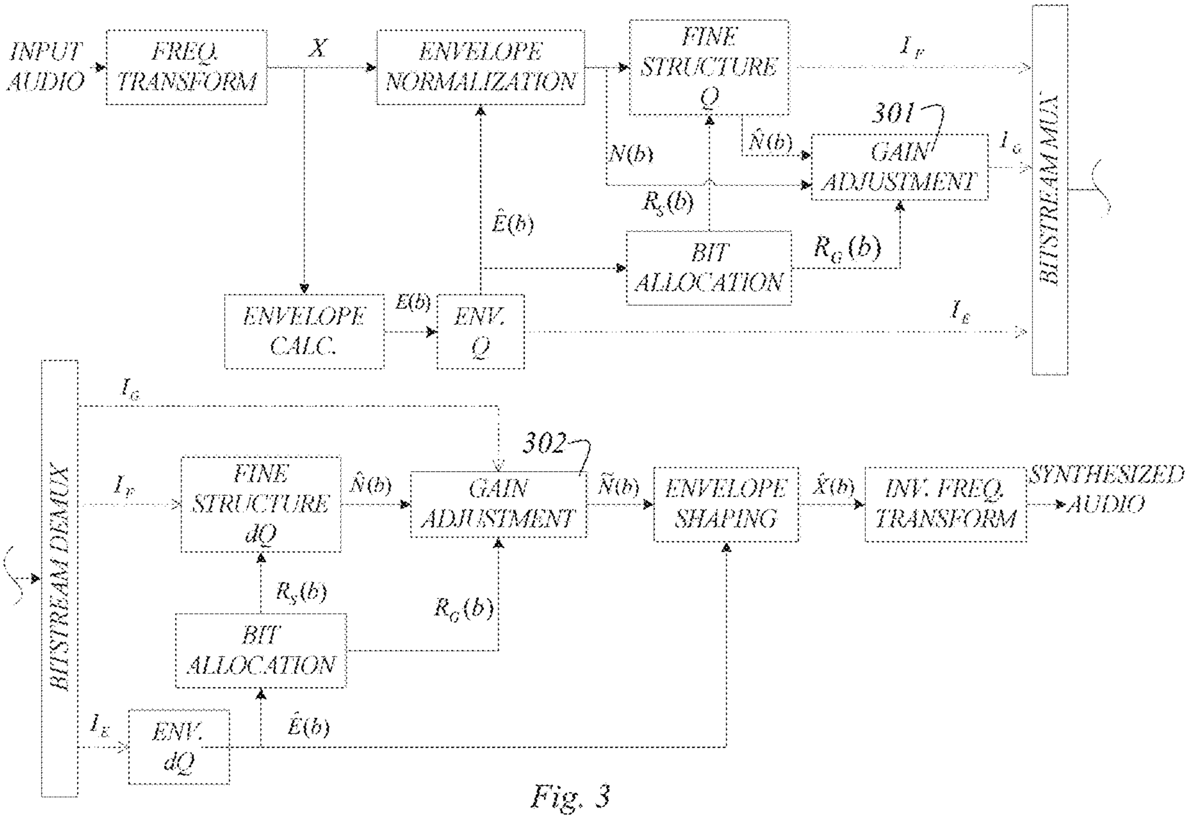
FIG. 3 is an example transform domain coding and decoding scheme based on gain-shape vector quantization, using a coded gain adjustment parameter after the shape quantization according to prior art.
Figure 4A:
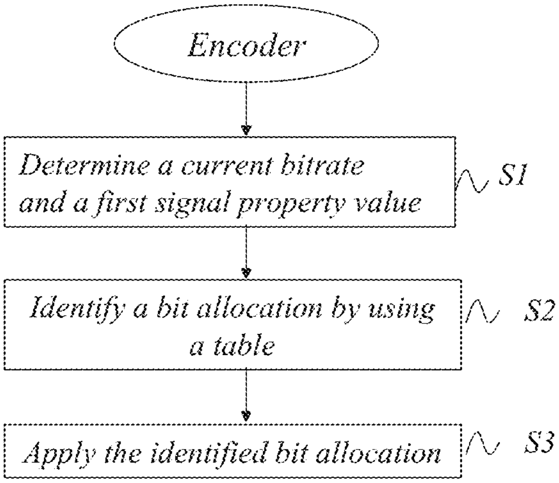
FIG. 4*a* shows a flowchart of a method in a decoder according to embodiments of the present invention and 4*b* shows a flowchart of a method in a decoder according to embodiments of the present invention.

Turning now to FIG. 4*a* showing a flowchart illustrating a method in an encoder according to the present invention. In the method, a current bitrate and a first signal property value are determined S1. Then one bit allocation is identified S2 using a table comprising information that indicates at least one bit allocation for the gain adjustment quantizer and the shape quantizer which are mapped to a bitrate and a first signal property and for the gain adjustment quantizer and the shape quantizer for the determined current bitrate and the first signal property. The identified bit allocation can now be applied S3 when encoding the gain shape vector.

Figure 4B:
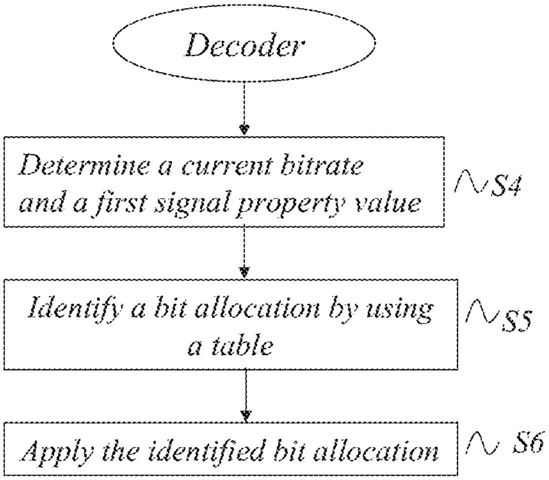
FIG. 4*c* and FIG. 4*d* illustrate a gain-shape VQ based transform domain coding and decoding scheme with an adaptive bit sharing algorithm according to embodiments of the present invention.

In FIG. 4*b* a flowchart illustrating a method in a decoder for allocating bits to a gain adjustment dequantizer and a shape dequantizer to be used for decoding a gain shape vector is shown according to the present invention. In the method, a current bitrate and a first signal property value are determined S4. Information from a table is used S5 to identify one bit allocation for the gain adjustment and the shape dequantizer for the determined current bitrate and the first signal property, wherein the table indicates at least one bit allocation for the gain adjustment dequantizer and the shape dequantizer which are mapped to a bitrate and a first signal property. Further, the identified bit allocation is applied S6 when decoding the gain shape vector.

Figure 4C:
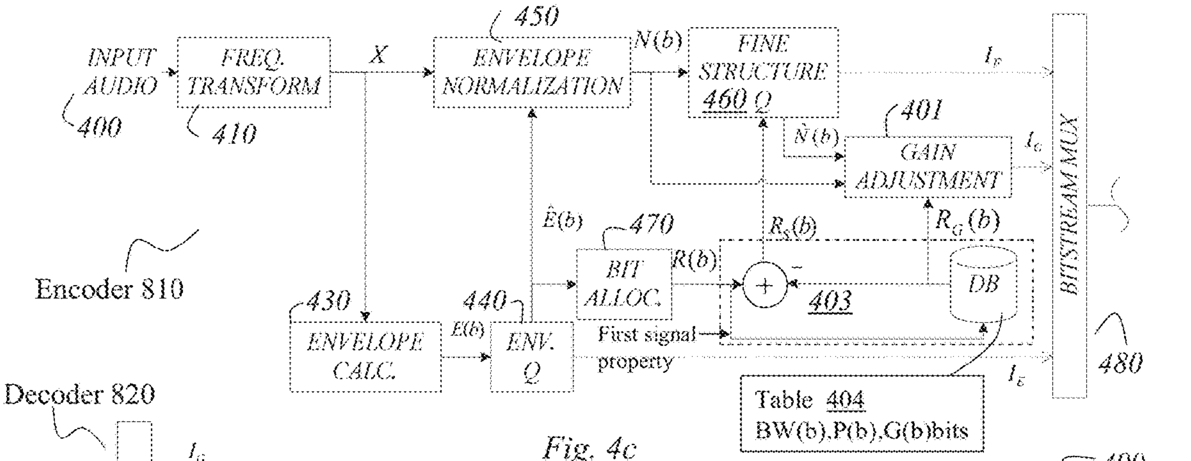
Figure 4D:
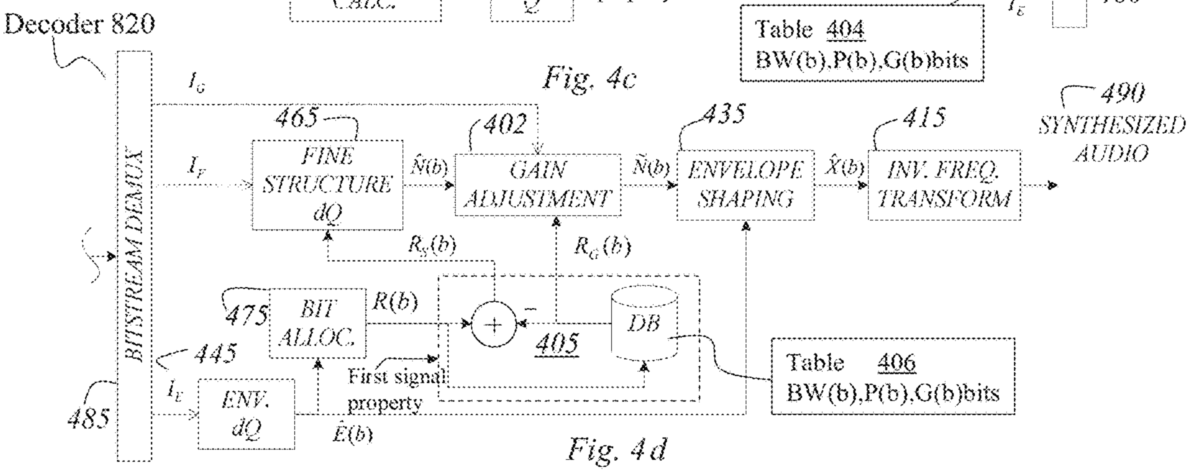

The first embodiment of the present invention is described in the context of a transform domain audio encoder and decoder system, using a pulse-based shape quantizer as shown in FIGS. 4*c* and 4*d*. Hence the first embodiment is exemplified by the following.

In a frequency transformer 410 of the encoder, the input audio is extracted into frames using 50% overlap and windowed with a symmetric sinusoidal window. Each windowed frame is then transformed to an MDCT spectrum X. The spectrum is partitioned into subbands for processing, where the subband widths are non-uniform. The spectral coefficients of frame m belonging to band b are denoted X(b,m) and have the bandwidth BW(b).

In the first embodiment it is assumed that the first signal property, i.e. the bandwidths BW(b) are fixed and known in both the encoder and the decoder. However, it is also possible to consider solutions where the band partitioning is variable, dependent on the total bitrate of the codec or adapted to the input signal. One way to adapt the band partitioning based on the input signal is to increase the band resolution for high energy regions or for regions which are deemed perceptually important. If the bandwidth resolution depends on the bitrate, the band resolution would typically increase with increasing bitrate.

Since most encoder and decoder steps can be described within one frame, the frame index m is omitted and the notation X(b) 420 is used. The bandwidths should preferably increase with increasing frequency to comply with the frequency resolution of the human auditory system. The root-mean-square (RMS) value of each band b is used as a normalization factor and is denoted E(b). E(b) is determined in the envelope calculator 430.

$$E(b) = \sqrt{\frac{X(b)^T X(b)}{BW(b)}}. \tag{4}$$

The RMS value can be seen as the energy value per coefficient. The sequence of E(b) for b=1, 2, . . . , $N_{band}$ forms the envelope of the MDCT spectrum, where $N_{bands}$ denotes the number of bands. Next, the sequence is quantized in order to be transmitted to the decoder. To ensure that the normalization done in the envelope normalization entity 450 can be reversed in the decoder, the quantized envelope $\hat{E}(b)$ is obtained from the envelope quantizer 440. In this exemplary embodiment, the envelope coefficients are scalar quantized in log domain using a step size of 3 dB and the quantizer indices are differentially encoded using Huffman coding. The quantized envelope coefficients are used to produce the shape vectors N(b) corresponding to each band b.

$$N(b) = \frac{1}{\hat{E}(b)} X(b). \tag{5A}$$

The quantized envelope $\hat{E}(b)$ is input to the perceptual model to obtain a bit allocation R(b) by a bit allocator 470. For each band, the assigned bits will be shared between a shape quantizer and quantizing a gain adjustment factor G(b). The number of bits assigned to the shape quantizer and gain adjustment quantizer will be decided by an adaptive bit sharing entity 403.

$$G(b) = \frac{\hat{N}(b)^T N(b)}{N(b)^T N(b)}. \tag{5B}$$

The gain adjustment factor determined by a gain adjustment entity 401 may compensate both for the envelope quantization error and the shape quantization error. Note that the compensation of the envelope quantization error assumes that the quantized fine structure vector is normalized to have RMS=1.

At the point of determining the bit sharing between the shape vector N(b) and the gain adjustment factor G(b) the synthesis shape $\hat{N}(b)$ is not known. In this exemplary embodiment, the shape quantizer is a pulse coding scheme which produces synthesis shape vectors with RMS=1, i.e. it cannot represent any energy deviation residing from the gain quantization error. The bit sharing is decided by using a table 404 stored in a database comprising a bit allocation for the gain adjustment quantizer and the shape quantizer for a number of combinations of bitrate and a first signal property. In this embodiment, the first signal property is bandwidth and this is known by the encoder and the decoder. The bit rates to be allocated for the gain adjustment quantizer and shape quantizer can be determined by performing the following steps:

1. The number of pulses in the synthesis shape $\hat{N}(b)$ is estimated from the band bit rate R(b). It should be noted that the band bit rate is the total bit rate which is to be shared between the gain adjustment quantization and the shape quantization. This can be done by subtracting the maximum number of bits used for gain adjustment $R_{G\_MAX}$ and using a lookup table for finding the number of pulses P(b) for the obtained rate R(b)−$R_{G\_MAX}$. The relation between the bitrate and number of pulses is given by the used shape quantizer. As an example, if a pulse requires a fixed number of bits $b_0$, then the relation between bit rate and pulses may be written as $$P(b) = \lfloor R(b)/b_0 \rfloor. \tag{6}$$

where ⌊•⌋ denotes rounding down to nearest integer value. In general, if efficient indexing schemes are used for the pulses, the number of pulses per bit may not be possible to show with a proportional relationship as in equation (6B). By using R(b)−$R_{G\_MAX}$ in the lookup the solution will be biased towards using more bits for the shape than the gain adjustment, since this was seen advantageous from a perceptual perspective.

Figure 5:
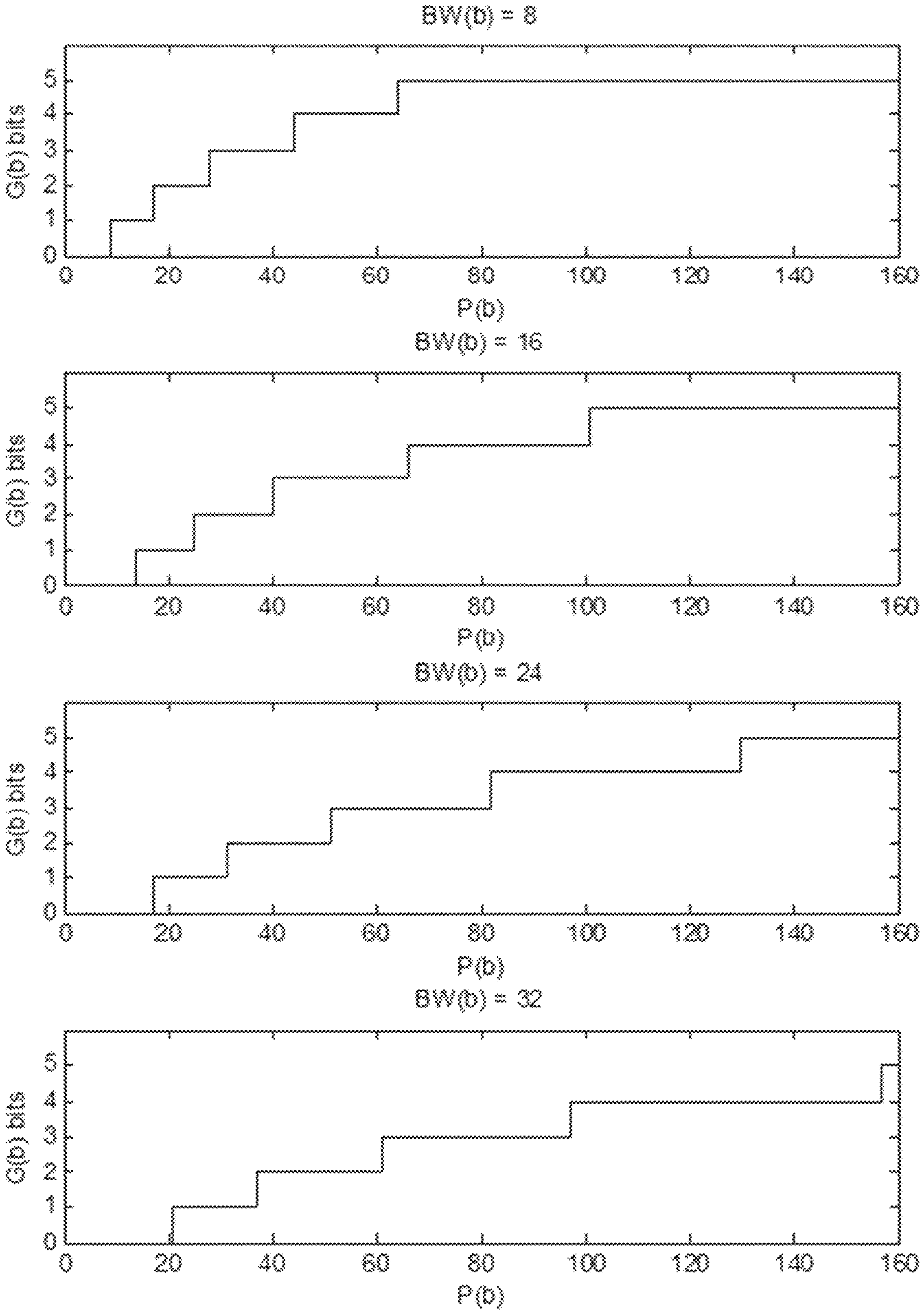
FIG. 5 shows an example lookup table which implements a bit sharing algorithm based on number of pulses and bandwidth.

2. Use the number of pulses to find the desired bit rate $R_G(b)$ for quantizing G(b). This value is retrieved by using the number of pulses P(b) and the bandwidth of the current band BW(b) in a lookup table of the database 404. This table contains averaged optimal bit allocations for combinations of (P(b),BW(b)) pairs which have been obtained by running the quantizer scheme on relevant audio data. That implies that an optimal distribution of bits is calculated for different combinations of bitrate and a signal property. In this embodiment the bitrate is translated to a number of pulses and the signal property corresponds to the bandwidth. An example of the combinations of (P(b), BW(b)) pairs in the lookup table is graphically shown in FIG. 5. Tables for different bandwidths (BW=8, BW=16, BW=24, BW=32), which includes the number of pulses (which is determined based on the bitrate R(b)), from which the bitrate for quantizing G(b) is determined. For the case when 0 bits are assigned for the gain, a zero-bit gain adjustment approach may be used.
3. The bit allocation for the shape quantizer is obtained by subtracting the gain adjustment bits from the bit budget for the band.

$$R_S(b)=R(b)-R_G(b). \tag{7}$$

After deciding the bitrates $R_S(b)$ and $R_G(b)$ the shape quantizer is applied to the shape vector N(b) and the synthesized shape $\hat{N}(b)$ is obtained in the quantization process. Next, the gain adjustment factor is obtained as described in equation (3). The gain adjustment factor is quantized using a scalar quantizer to obtain an index which may be used to produce the quantized gain adjustment $\hat{G}(b)$. The indices from the envelope quantizer $I_F$ fine structure quantizer $I_F$ and gain adjustment quantizer $I_G$ are multiplexed to be transmitted to a decoder or stored.

To obtain the lookup table used in step 2) above, the following procedure can be used. First, training data can be obtained by running the analysis steps described above to extract M equal length shape vectors N(b) from speech and audio signals which the codec is intended to be used for. The shape vector can be quantized using all number of pulses in the considered range, and the gain adjustment factor can be quantized using all number of bits in the considered range. A gain adjusted synthesis shape $\tilde{N}_n$ can be generated for all combinations of pulses p and gain bits r.

$$\tilde{N}_m=Q_S(N_m,p)Q_G(G_m,r).$$

The squared error distance (distortion) for each of these combinations can be expressed in a three-dimensional matrix $$D(r,p,m)=(N_m-\tilde{N}_m)^T(N_m-\tilde{N}_m).$$

An average distortion per combination can be assessed $$\overline{D}(r,p)=\frac{1}{M}\sum_{m=1}^{M}D(r,p,m)..$$

Figure 7:
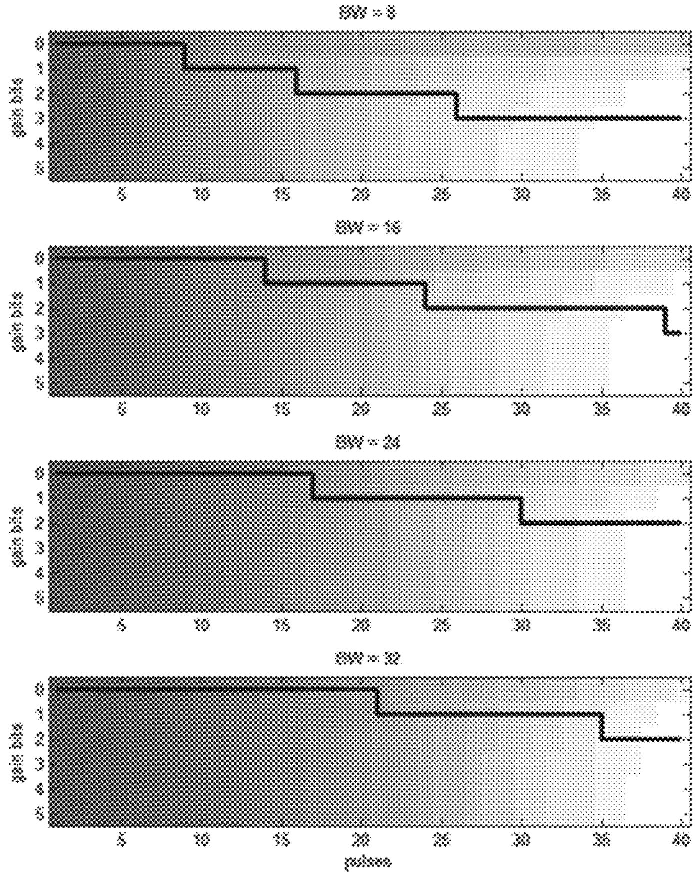
FIG. 7 shows an example how a gain bit allocation table may be derived by using averaged squared errors evaluated between an input and synthesized vector using all considered combinations of gain bits and number of pulses. A darker shade indicates higher average distortion for the particular gain bits/pulses combination. The thick black line shows a greedy path through the matrix for each considered bandwidth, which decides at each point if resources are better spent on gain bits or additional pulses. The thick black line corresponds to the lookup table in FIG. 6.

An example average distortion matrix $\overline{D}(r,p)$ is illustrated in FIG. 7, where a separate distortion matrix is shown for all bandwidths used in the codec. The intensity of the matrix denotes the average distortion, such that a lighter shade of gray corresponds to lower average distortion. Starting at (r=0,p=0) a path can be found through the matrix using a greedy approach where each step was taken to maximize the reduction of average distortion. That is, in each iteration the positions (r+1,p) and (r,p+1) can be considered and the selection can be made based on the largest distortion reduction for either $\overline{D}(r+1,p)-\overline{D}(r,p)$ or $\overline{D}(r,p+1)-\overline{D}(r,p)$.

The process can be repeated for all vector lengths (bandwidths) used in the codec.

The decoder according to the first embodiment demultiplexes by a bitstream demultiplexer 485 the indices from the bitstream and forwards the relevant indices to each decoding module 445,465. First, the quantized envelope $\hat{E}(b)$ is obtained by the envelope dequantizer 445 using the envelope indices $I_E$. Then the bit allocationR(b) is derived by the bit allocator 475 using $\hat{E}(b)$. The steps of the encoder to obtain the number of pulses per band and finding the corresponding $R_S(b)$ and $R_G(b)$ is repeated by using an adaptive bit sharing entity 405 and a table 406 stored in a database. The table is associated with the adaptive bit sharing entity which implies that the table may either be located inside or outside the bit sharing entity. Using the designated bits rates together with the fine structure quantizer index $I_F$ and the gain adjustment index $I_G$, the synthesized shape $\hat{N}(b)$ and quantized gain adjustment factor $\hat{G}(b)$ are derived by a gain adjustment entity 402 and an envelope shaping entity 435. The subband synthesis $\hat{X}(b)$ is obtained from the product of the envelope coefficient, gain adjustment and shape values:

$$\hat{X}(b)=\hat{E}(b)\hat{G}(b)\hat{N}(b). \tag{8}$$

The union of the synthesized vectors $\hat{X}(b)$ forms the synthesized spectrum $\hat{X}$ which is further processed using the inverse MDCT transform 415, windowed with the symmetric sine window and added to the output synthesis using the overlap-and-add strategy to provide synthesized audio 490.

Figure 6:
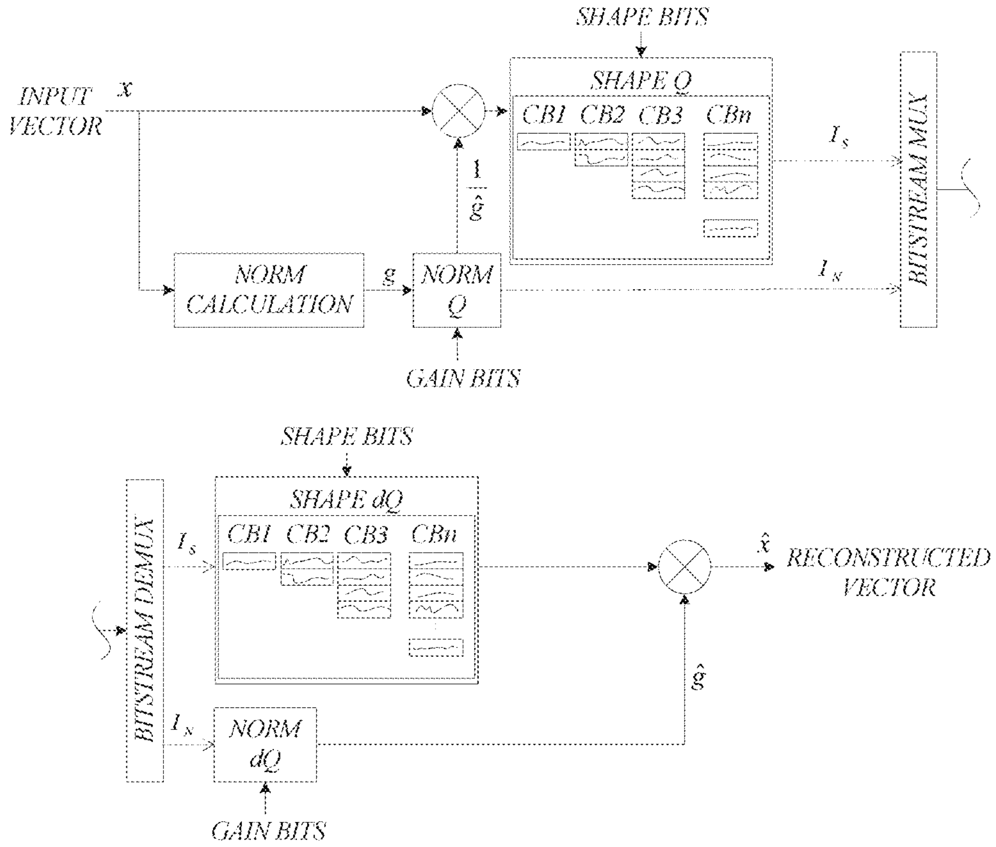
FIG. 6 shows an example of a gain-shape VQ scheme with a multiple codebook setup for the shape quantizer and dequantizer.

In the second embodiment, a QMF filterbank is used to split the signal into different subbands. Here, each subband represents a down-sampled time domain representation of each the band. Each time domain vector is treated as a vector which is quantized using a gain-shape VQ strategy. The shape quantizer is implemented using a multiple-codebook unconstrained vector quantizer, where codebooks of different sizes CB(n) are stored. The larger the number of bits assigned to the shape, the larger the codebook size. For instance, if n shape bits are assigned, CB(n+1) will be used which is a codebook of size $2^n$. The codebooks CB(n) have been found by running a training algorithm on a relevant set of training data shape vectors for each number of bits, e.g. by using the well-known Generalized Max-Lloyd Algorithm. The centroid (reconstruction point) density increases with the size and hence gives a reduced distortion for increased bitrate. All entries of the shape VQ have been normalized to RMS=1 and which means that the shape VQ cannot represent any energy deviations. An illustration of an example gain-shape quantization scheme using a multiple codebook shape VQ is shown in FIG. 6. From an overview perspective, the second embodiment can be described as shown in FIGS. 4*c* and 4*d*, although the table stored in the database DB is now derived using the multiple codebook VQ to ensure efficient operation for this setup.

The encoder of the second embodiment applies the QMF filter bank to obtain the subband time domain signals X (b). Note that the subband is now represented by a critically sub-sampled time domain signal corresponding to band b. The RMS values of each subband signal are calculated and the subband signals are normalized. The envelope E(b), quantized envelope $\hat{E}(b)$, the subband bit allocation R(b) and normalized shape vectors N(b) are acquired as in embodiment 1. The length of the subband signal is denoted L(b), which is the same as the number of samples in the subband signal or the length of the vector N(b) (c.f. BW(b) in embodiment 1). Next, the bit sharing ($R_S$(b),$R_G$(b)) is obtained by using a lookup-table which is defined for rate R(b) and signal length L(b). The lookup table has been derived in a similar way as in embodiment 1. Using the obtained bitrates, the shape and gain adjustment vectors are quantized. In particular, the shape quantization is done by selecting a codebook depending on the number of available bits $R_S$(b) and finding the codebook entry with the minimum squared distance to the shape vector N(b). In the second embodiment, the entry is found by exhaustive search, i.e. computing the squared distance to all vectors and selecting the entry which gives the smallest distance.

The indices from the envelope quantizer, shape quantizer and gain adjustment quantizer are multiplexed to be transmitted to a decoder or to be stored.

The decoder of the second embodiment demultiplexes the indices from the bitstream and forwards the relevant indices to each decoding module. The quantized envelope $\hat{E}$(b) and the bit allocation R(b) are obtained like in embodiment 1. Using a bit sharing lookup table which corresponds to the one used in the encoder, the bitrates $R_S$(b) and $R_G$(b) are obtained, and together with the quantizer indices the synthesized shape $\hat{N}$(b) and gain adjustment $\hat{G}$(b) are obtained. The temporal subband synthesis $\hat{X}$(b) is generated using equation (7). The synthesized output audio frame is generated by applying the synthesis QMF filterbank to the synthesized subbands.

Accordingly, an encoder for allocating bits to a gain adjustment quantizer and a shape quantizer to be used for encoding a gain shape vector is provided with reference to FIG. 4*c*. The encoder comprises an adaptive bit sharing entity 403 configured to determine a current bitrate and a first signal property value, to use information from a table 404 indicating at least one bit allocation for the gain adjustment quantizer and the shape quantizer which are mapped to a bitrate and a first signal property, to identify using said table 404 one bit allocation for the gain adjustment quantizer and the shape quantizer for the determined current bitrate and the first signal property, and a gain adjustment quantizer 401 referred to as a gain adjustment entity and a shape quantizer referred to as a fine structure quantizer configured to apply the identified bit allocation when encoding the gain shape vector. It should be noted that the table 404 is associated with the adaptive bit sharing entity 403 which implies that the table may either be located inside or outside the bit sharing entity.

A decoder for allocating bits to a gain adjustment dequantizer and a shape dequantizer to be used for decoding a gain shape vector is provided. The decoder comprises an adaptive bit sharing entity 405 configured to determine a current bitrate and a first signal property value and to use information from a table 406 indicating at least one bit allocation for the gain adjustment dequantizer and the shape dequantizer which are mapped to a bitrate and a first signal property. The adaptive bit sharing entity 405 is further configured to identifying using said table 406 one bit allocation for the gain adjustment dequantizer and the shape dequantizer for the determined current bitrate and the first signal property, and the decoder further comprises a gain adjustment dequantizer also referred to as a gain adjustment entity and a shape dequantizer also referred to as fine structure dequantizer, respectively configured to apply the identified bit allocation when decoding the gain shape vector. It should be noted that the table 406 is associated with the adaptive bit sharing entity 405 which implies that the table may either be located inside or outside the bit sharing entity.

Figure 8:
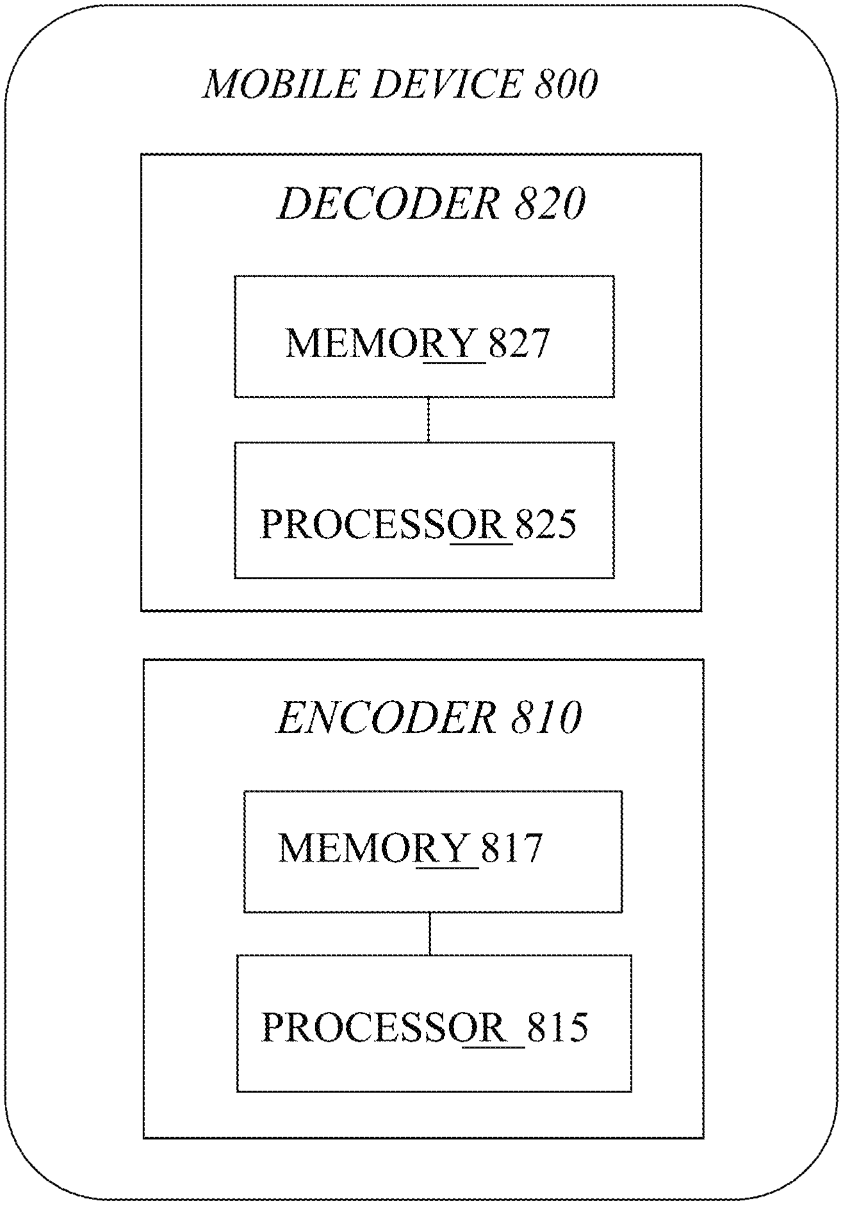
FIG. 8 illustrates that an encoder and a decoder according to embodiments of the present invention are implemented in a mobile terminal.

It should be noted that the entities of the encoder 810 and the decoder 820, respectively, can be implemented by a processor 815,825 configured to process software portions providing the functionality of the entities as illustrated in FIG. 8. The software portions are stored in a memory 817,827 and retrieved from the memory when being processed.

According to a further aspect of the present invention, a mobile device 800 comprising the encoder 810 and or a decoder 820 according to the embodiments is provided. It should be noted that the encoder and the decoder of the embodiments also can be implemented in a network node.

What is claimed is:

1. A method in an encoder for allocating bits to a gain adjustment quantizer and a shape quantizer to be used for encoding a gain shape vector, the method comprising:
- determining a current bitrate and a signal bandwidth;
- mapping a bit allocation to the gain adjustment quantizer and the shape quantizer based on the current bitrate and the signal bandwidth; and
- applying the bit allocation when encoding the gain shape vector.

2. The method of claim 1, wherein mapping the bit allocation is based further on a signal length.

3. The method of claim 1, wherein the signal bandwidth is fixed and known at the encoder.

4. The method of claim 1, wherein the encoder is a transform domain audio encoder.

5. The method of claim 1, wherein said determining the signal bandwidth comprises determining the signal bandwidth of an audio signal input to the encoder.

6. A method in a decoder for allocating bits to a gain adjustment dequantizer and a shape dequantizer to be used for decoding a gain shape vector, the method comprising:
- determining a current bitrate and a signal bandwidth;
- mapping a bit allocation to the gain adjustment quantizer and the shape quantizer based on the current bitrate and the signal bandwidth; and
- applying the bit allocation when decoding the gain shape vector.

7. The method of claim 6, wherein mapping the bit allocation is based further on a signal length.

8. The method of claim 6, wherein the signal bandwidth is fixed and known at the decoder.

9. The method of claim 6, wherein the decoder is a transform domain audio decoder.

10. The method of claim 6, wherein said determining the signal bandwidth comprises determining the signal bandwidth of an audio signal input to be output from the decoder.

11. An encoder for allocating bits to a gain adjustment quantizer and a shape quantizer to be used for encoding a gain shape vector, wherein the encoder comprises an adaptive bit sharing entity configured to determine a current bitrate and a signal bandwidth and to map a bit allocation to the gain adjustment quantizer and the shape quantizer based on the current bitrate and the signal bandwidth, and a gain adjustment quantizer and a shape quantizer configured to apply the bit allocation when encoding the gain shape vector.

12. The encoder of claim 11, wherein mapping the bit allocation is based further on a signal length.

13. The encoder of claim 11, wherein the signal bandwidth is fixed and known at the encoder.

14. The encoder of claim 11, wherein the encoder is a transform domain audio encoder.

15. The encoder of claim 11, wherein the adaptive bit sharing entity is configured to determine the signal bandwidth of an audio signal input to the encoder.

16. A decoder for allocating bits to a gain adjustment dequantizer and a shape dequantizer to be used for decoding a gain shape vector, the decoder comprises an adaptive bit sharing entity configured to determine a current bitrate and a signal bandwidth and to map a bit allocation to the gain adjustment quantizer and the shape quantizer based on the current bitrate and the signal bandwidth, and a gain adjustment quantizer and a shape dequantizer configured to apply the bit allocation when decoding the gain shape vector.

17. The decoder of claim 16, wherein mapping the bit allocation is based further on a signal length.

18. The decoder of claim 16, wherein the signal bandwidth is fixed and known at the decoder.

19. The decoder of claim 11, wherein the decoder is a transform domain audio decoder.

20. The decoder of claim 16, wherein the adaptive bit sharing entity is configured to determine the signal bandwidth of an audio signal to be output from the decoder.

* * * * *